3,578,673
**3-NITROARYL-4-HALOISOXAZOLES AND
METHOD FOR PREPARING SAME**
Herman A. Bruson, Woodbridge, and Howard L. Plant,
Milford, Conn., assignors to Olin Corporation
No Drawing. Filed Sept. 30, 1968, Ser. No. 775,972
Int. Cl. C07d 85/22
U.S. Cl. 260—307                                     2 Claims

ABSTRACT OF THE DISCLOSURE

The nitration of aryl-2,2-dihalocyclopropanes in the presence of higher oxides of nitrogen, principally dinitrogen tetroxide, gives 3-nitroaryl-4-haloisoxazoles by a new reaction which can be formulated as follows:

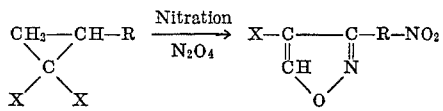

where R is a substituted aryl radical and X is chlorine or bromine. These new compounds are useful as fungicides, insecticides or herbicides, and as intermediates for dyestuffs.

---

The present invention deals with a novel process for preparing isoxazoles having a nitroaryl group in the 3-position and a halogen in the 4-position of the isoxazole ring.

The new compounds of this invention, which have the formula:

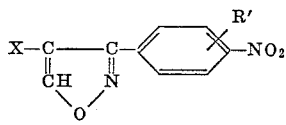

wherein X is a halogen selected from the group consisting of chlorine or bromine, R' is selected from the group consisting of hydrogen, chlorine, bromine, hydroxy, nitro, phenyl, carboxyl, alkyl, aryloxy, aralkyl, and cycloalkyl, are obtained by subjecting aryl-(2,2-di(chloro or bromo) cyclopropanes) to nitration with mixed concentrated nitric and sulfuric acids in the presence of higher oxides of nitrogen, principally dinitrogen tetroxide or a mixture of nitric oxide and air, and subsequently treating the nitration mixture with water. Preferably, the alkyl substituent of the novel compounds of this invention has from 1 to 5 carbon atoms, the aryloxy group not more than 8 carbon atoms, the aralkyl group not more than 11 carbon atoms and the cycloalkyl group from 3 to 8 carbon atoms.

The overall reaction can be represented as a combined nitration of the aromatic ring, and ring opening of the cyclopropane group, the latter being induced by the dinitrogen tetroxide or other higher oxides of nitrogen, generated in the reaction or purposely added to the reaction mixture. The reaction proceeds as shown below, where for purposes of illustration the reaction of 1,1-dichloro-2-phenylcyclopropane with a mixture of nitric and sulfuric acids in the presence of dinitrogen tetroxide, is shown:

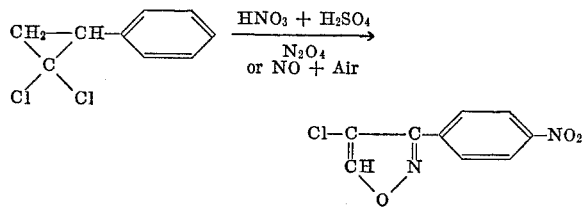

If the higher oxides of nitrogen are not present during the nitration process, the dichlorocyclopropane ring remains essentially intact and only nitration of the aromatic ring occurs. However, when "red fuming" nitric acid is employed as the nitrating agent, advantageously with concentrated sulfuric acid, or if dinitrogen tetroxide is added to the nitration mixture, before, during or after the nitration reaction, the scission of the di(chloro or bromo) cyclopropane ring occurs to give the desired 3-nitroaryl-4-haloisoxazole.

In carrying out this invention, one can use nitric acid containing upwards of 60 percent nitric acid such as commercial grades of 69–70 percent concentrated nitric acid or white fuming 90–100 percent $HNO_3$. The concentrated nitric acid employed must contain, in dissolved form, the higher oxides of nitrogen, such as commercial grades of red fuming nitric acid ($d^{15°}$ 1.59–1.60) which have 20 percent by weight of dissolved oxides of nitrogen calculated as nitrogen dioxide. Liquid or gaseous nitrogen dioxide can be added to ordinary concentrated 69–70 percent nitric acid to give an effective reagent for the process. The sulfuric acid used is advantageously of a concentration above 80 percent $H_2SO_4$, preferably 96–98 percent $H_2SO_4$. In conducting the process of this invention it is necessary to add the aryl-(2,2-dihalocyclopropane) to the mixed acid.

Recovery of the isoxazole product can be accomplished by a number of methods well known in the art. For example, the reaction mixture can be added to a slurry of ice and water or to cold diethyl ether containing methanol which results in precipitation of the product. The crude product can then be recovered from the slurry by filtration, decantation, centrifugation, or by any other suitable method. Recrystallization from methanol or glacial acetic acid gives the pure isoxazole product.

Starting materials useful in the process of this invention include; for example:

1,1-dichloro-2-phenylcyclopropane
1-chloro-1-bromo-2-phenylcyclopropane
1-chloro-1-bromo-2(2'-hydroxyphenyl) cyclopropane
1,1-dibromo-2(3'-hydroxyphenyl) cyclopropane
1,1-dichloro-2-(2'-nitrophenyl) cyclopropane
1-chloro-1-bromo-2(3'-nitrophenyl) cyclopropane
1-chloro-1-bromo-2(2'-carboxphenyl) cyclopropane
1,1-dibromo-2(3'-carboxyphenyl) cyclopropane 1,1-dichloro-2(2'-chlorophenyl) cyclopropane
1-chloro-1-bromo-2(3'-chlorophenyl) cyclopropane
1-chloro-1-bromo-2(3'-bromophenyl) cyclopropane
1,1-dibromo-2(3'-bromophenyl) cyclopropane 1,1-dichloro-2(2'-methylphenyl) cyclopropane
1-chloro-1-bromo-2(3'-isopropylphenyl) cyclopropane
1,1-dichloro-2(2'-ethylphenyl) cyclopropane
1-chloro-1-bromo-2(2'amylphenyl) cyclopropane 1,1-dichloro-2(2'-methoxyphenyl) cyclopropane
1,1-dichloro-2(3'-n-propylphenyl) cyclopropane
1-chloro-1-bromo-2(2'-isopropylphenyl) cyclopropane
1,1-dibromo-2(3'-n-butylphenyl) cyclopropane
1-chloro-1-bromo-2(3'-n-amylphenyl) cyclopropane
1,1-dibromo-2(2'-isoamylphenyl) cyclopropane 1,1-dichloro-2(2'-phenoxyphenyl) cyclopropane
1-chloro-1-bromo-2(2'-tolyloxyphenyl) cyclopropane
1-chloro-1-bromo-2(3'-ethylphenoxyphenyl) cyclopropane
1,1-dichloro-2(3'-isopropylphenoxyphenyl) cyclopropane 1,1-dichloro-2(2'-tolyphenyl) cyclopropane
1-chloro-1-bromo-2(3'-xylylphenyl) cyclopropane
1,1-dibromo-2(2'-tolyphenyl) cyclopropane 1,1-dichloro-2(2'-cyclopropylphenyl) cyclopropane
1-chloro-1-bromo-2(3'-cyclobutylphenyl) cyclopropane
1,1-dibromo-2(2'-cyclopropylphenyl) cyclopropane
1-chloro-1-bromo-2(2'-cycloheptylphenyl) cyclopropane
1,1-dichloro-2(2'-cyclooctylphenyl) cyclopropane The 1,1-dihalo-2-phenylcyclopropane starting materials for the method of this invention can be prepared by the process set forth in U.S. Pat. 3,376,349. For example, the compound 1,1-dichloro-2-phenylcyclopropane can be prepared as follows:

A mixture of 104 g. styrene, 120 g. of chloroform, 120 g. sodium hydroxide, 10 g. of water and 100 ml. of tertiary amyl alcohol is rapidly stirred and heated under reflux at 90–97° C. for 35 minutes. At this point the mixture contains about 1.5 moles of water, and the conversion to the dichlorocarbene adduct is about 60 percent of theory based on the styrene charged.

An additional quantity of 60 g. (0.5 mole) of chloroform and 40 g. (1 mole) of sodium hydroxide is added to the cooled product. This reaction mixture is rapidly stirred and then reheated to 101° C. under reflux during a period of about 45 minutes. Upon cooling, pouring into 500 ml. of water, and working up the water-insoluble layer by distillation under reduced pressure, the yield of 1,1-dichloro-2-phenylcyclopropane obtained, (boiling at 77–79° C./2 mm.; $n_D^{25}$ 1.5505) is about 153 g. or 82 percent of theory, based on the styrene charged.

In a like manner, the compound 1,1-dibromo-2-phenylcyclopropane can be prepared as described about by reacting bromoform, styrene, and sodium hydroxide in the presence of water and tertiary amyl alcohol with rapid stirring and heating under reflux.

The novel isoxazole compounds of this invention are useful as fungicides, insecticides, or herbicides and as intermediates for dyestuffs.

The compounds of this invention are active against a wide group of microorganisms as indicated by the following in vitro spectrum of the compound:

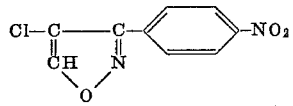

TABLE 2

Antibacterial spectrum

Organism: M.I.C. in micrograms/ml.[1]
Pseudomonas aeruginosa ------------------ >50
Salmonella schottmülleri ------------------ 18
Aerobacter aerogenes --------------------- >50
Proteus vulgaris ------------------------- 18
Klebsiella pneumoniae -------------------- 25
Escherichia coli ------------------------- 18
Bacillus subtilis ------------------------ 18

[1] Minimal Inhibitory Concentration (M.I.C.) micrograms/ml. solvent-dimethylformamide.

The following examples illustrate this invention and are to be considered not limitative.

EXAMPLE I 1,1-dichloro-2-phenylcyclopropane (23.5 g., 0.125 mole) was added dropwise during the course of one hour to a vigorously stirred mixture of 25 g. 96–98 percent sulfuric acid and 50 g. red fuming nitric acid having a density at 15° C. of 1.59–1.60 and containing 20 percent by weight of dissolved oxides of nitrogen calculated as nitrogen dioxide. During the addition the reaction mixture was maintained at −10° C. by means of a cooling bath. Stirring was continued for an additional 1.5 hours at 25–30° C. The mixture was then poured into a slurry of 300 g. of ice and water, stirred for 15 minutes and then treated slowly mith 250 ml. of diethyl ether to break the emulsion. The entire mixture was filtered by suction to yield 13.1 g. (45 percent yield) of crystalline 3-(4'-nitrophenyl)-4-chloroisoxazole having the formula:

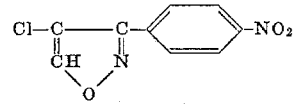

After recrystallization from menthanol the product formed colorless crystals, M.P. 193.5–194° C.

Analysis.—Calc'd for $C_9H_5ClN_2O_3$ (percent): C, 48.1; H, 2.23; Cl, 15.8; N, 12.47. Found (percent): C, 48.16; H, 2.38; Cl, 15.72; N, 12.43.

The infra-red as well as the nuclear magnetic resonance and mass spectrum of the compound agreed with the above structure.

EXAMPLE II

Twenty-five (25) g. of red fuming nitric acid (20 percent $NO_2$) (Sp. g. 1.59) was vigorously stirred and maintained at −20 to −30° C. while 9.4 g. (0.05 mole) of 1,1-dichloro-2-phenylcyclopropane was added dropwise over a period of thirty minutes. After being stirred for an additional thirty minute period, the reaction mixture was slowly added with stirring to 150 ml. of ice cold diethyl ether containing 15 ml. of methanol. The slurry was stirred for thirty minutes, filtered by suction, and vacuum dried. A total of 3.8 g. (34 percent theory) of product which melted at 192–194° C. was recovered. Recrystallization from methanol or glacial acetic acid yielded the pure product melting at 193.5–194° C. and having the formula:

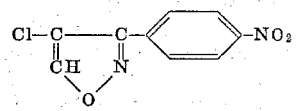

What is claimed is:
1. A method for preparing a compound of the formula:

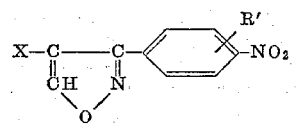

wherein X is selected from the group consisting of chlorine or bromine, R' is selected from the group consisting of hydrogen, chlorine, bromine, nitro and alkyl of 1 to 5 carbon atoms, which comprises reacting a composition of the formula:

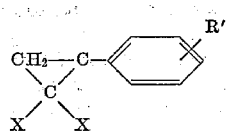

wherein X and R' have the same meaning as previously described, with the proviso that the R' cannot be in the 4' position, with a mixture of concentrated nitric and sulfuric acids in the presence of $N_2O_4$.

2. A method for preparing 3-(4'-nitrophenyl)-4-chloroisoxazole which comprises reacting 1,1-dichloro-2-phenylcyclopropane with a mixture of concentrated nitric and sulfuric acids in the presence of $N_2O_4$.

References Cited

Wiley: "Heterocyclic Compounds," vol. 17, 1962, Interscience Publishers, p. 67.

ALEX MAZEL, Primary Examiner

R. V. RUSH, Assistant Examiner

U.S. Cl. X.R.

71—88; 260—999